United States Patent [19]
Gupta et al.

[11] Patent Number: 6,026,393
[45] Date of Patent: Feb. 15, 2000

[54] CONFIGURATION KNOWLEDGE AS AN AID TO CASE RETRIEVAL

[75] Inventors: Kalyan Moy Gupta, Brampton; Alan Mark Langley, Mississauga, both of Canada

[73] Assignee: Casebank Technologies Inc., Brampton, Canada

[21] Appl. No.: 09/052,119

[22] Filed: Mar. 31, 1998

[51] Int. Cl.[7] .............................. G06F 17/30; G06F 15/18
[52] U.S. Cl. ................................. 707/3; 706/50; 706/46; 706/54
[58] Field of Search .................. 706/45–47, 49, 706/50, 54, 59, 61; 704/9; 707/1–3, 103, 104

[56] References Cited

U.S. PATENT DOCUMENTS

| | | | |
|---|---|---|---|
| 4,697,243 | 9/1987 | Moore et al. | 706/59 |
| 4,763,277 | 8/1988 | Ashford et al. | 706/47 |
| 4,964,125 | 10/1990 | Kim | 714/216 |
| 4,985,857 | 1/1991 | Bajpai et al. | 702/184 |
| 5,107,497 | 4/1992 | Lirov et al. | 714/26 |
| 5,127,005 | 6/1992 | Oda et al. | 714/26 |
| 5,224,206 | 6/1993 | Simoudis | 706/61 |
| 5,317,677 | 5/1994 | Dolan et al. | 706/10 |
| 5,319,739 | 6/1994 | Yoshiura et al. | 706/54 |
| 5,581,664 | 12/1996 | Allen et al. | 706/46 |
| 5,586,218 | 12/1996 | Allen | 706/12 |
| 5,701,399 | 12/1997 | Lee et al. | 706/11 |
| 5,701,400 | 12/1997 | Amado | 706/45 |
| 5,715,374 | 2/1998 | Heckerman et al. | 706/46 |
| 5,715,468 | 2/1998 | Budzinski | 704/9 |
| 5,717,835 | 2/1998 | Hellerstein | 706/46 |
| 5,761,496 | 6/1998 | Hattori | 707/5 |
| 5,787,234 | 7/1998 | Molloy et al. | 706/46 |
| 5,794,237 | 8/1998 | Gore, Jr. et al. | 707/5 |
| 5,822,743 | 10/1998 | Gupta et al. | 706/50 |
| 5,870,768 | 2/1999 | Hekmatpour | 707/501 |
| 5,899,985 | 5/1999 | Tanaka | 706/45 |

Primary Examiner—Maria N. Vonbuhr
Attorney, Agent, or Firm—Bereskin & Parr

[57] ABSTRACT

A method and system for reducing the number of cases in a cased based reasoning system that are considered applicable to a current problem for a specific complex apparatus. In addition to a database of previously solved cases, the system has a domain database containing all components that make up a set of apparatus. The system also has a database containing configuration knowledge which defines the components from the domain that are excluded from a specific apparatus. The configuration information is used to filter any cases from consideration as potential solutions if they reference components not in the configuration of the specific apparatus for which the current problem exists. The configuration knowledge is also used to display to the user only the components that make up the specific apparatus for which the current problem exists. The configuration knowledge also includes information on default values for components within the specific apparatus. The default values being used to avoid prompting the user to answer a question for which the value is already known.

7 Claims, 11 Drawing Sheets

FIG. 9

SpotLight Initial Problem Description

Originator   SGriffiths

Case Source    [Field Experience ▼]         Send Number    [7152 ▼]
                                                            7099
Airline Code   [BRAD ▼]                     Airport Code    7136
                                                            7140
Aircraft Type  [Regional Jet (CRJ) ▼]       Date Started    7152
                                                            7176

Additional Information

ATA Chapter [ ▼ ]                              [🔍 Find]

| EICAS Warning | EICAS Caution | EICAS Status |
|---|---|---|
| ANTHCE DUCT ▼ | A/SKID INBD ▼ | 10TH ISOL OPEN ▼ |
| CONFIG RUDDER | A/SKID OUTBD | AC UTIL 1 OFF |
| CONFIG SPURS | AC BUS 1(2) | AC UTIL 2 OFF |
| GEAR DISAGREE | AC ESS BUS | APU ECU FAIL |
| ICE | AC SERV BUS | CONT IGNITION |
| L(R) 14TH DUCT | AP PITCH TRIM | COOL EXHAUST F |
| L(R) JETPIPE OVI- | AP TRIM IS LWD | EMER LTS ON |
| NOSE DOOR OPE | APU FAULT | FDR FAIL |
| PARKING BRAKE ▼ | APUL CV FAIL ▼ | FLAPS HAI FSPFF ▼ |

[Components>>]  [Consultation]      [✖ Cancel]       [? Help]

118 — 120

CONFIGURATION KNOWLEDGE AS AN AID TO CASE RETRIEVAL

FIELD OF THE INVENTION

The present invention relates to computer systems that implement case-based reasoning as an aid in trouble shooting problems with complex apparatus and systems.

BACKGROUND OF THE INVENTION

Attempting to diagnose a solution to a problem in a complex apparatus, such as an airplane, can be very error prone and time consuming. Traditionally a solution is found by searching through diagnostic manuals provided by the manufacturer. Complex apparatus, however, generally have components made by more than one manufacturer. Each component may vary in construction and functionality as the manufacturer often provides newer versions over time. The complexity of the apparatus combined with the variety of possible components it contains, often requires a significant amount of time to solve the current problem. Further, the technician attempting to solve the problem has only the diagnostic manuals and his own experience.

In an attempt to reduce the time required to find a solution, as well as to improve the accuracy of the solution found, numerous computer-based troubleshooting systems have been developed. One such solution has been to implement expert systems. Expert systems are an attempt to embody the knowledge of an expert into a computer. Such systems typically make use of a set of rules to determine what action to take next. The difficulty with rule based systems is that they do not lend themselves well to the addition of new rules as the systems they are meant to diagnose become more complex. Further, the typical expert system is stymied if the user is unable to provide the information needed by the program. To overcome these shortcomings a new knowledge-based paradigm known as case-based reasoning was developed. One such case-based reasoning system, described in the applicant's U.S. patent application Ser. No. 08/835,558, filed Apr. 8, 1997, now U.S. Pat. No. 5,822,743, comprises a database of solved cases and a reasoning engine to extract relevant cases from the database. One of the key advantages of case-based reasoning systems is that they provide a repository of knowledge that has been distilled from historical records or occurrences on how to solve problems, which is far greater than that which could be expected to reside in an individual technician or even several technicians who work together.

As the database of solved cases in a case-based reasoning system increases in size, the time required to locate and extract cases relevant to the current problem increases as well. The database typically contains all cases for all configurations of apparatus, including cases that are not relevant to the configuration of the known piece of apparatus having the current problem. The user may not have enough knowledge to determine which components make up the piece of apparatus having the problem and thus enter information for components that are not within the apparatus. Since case-based reasoning systems select the relevant solved cases from the information entered by the user, it is quite possible to present some cases that are not relevant to the apparatus in question. Allowing the user to enter information on non-relevant components and then providing the user with irrelevant solution cases furthers the possibility of diverging from the correct solution.

There is accordingly a need for an enhancement to a case-based reasoning system which reduces the time required to select relevant cases and which improves the accuracy of the case selection process, thus providing the user with potential solution cases that apply only to the problem at hand.

SUMMARY OF THE INVENTION

This invention is directed to a method for matching solved cases to a new problem in a case-based reasoning system, comprising the steps of: storing case data for a plurality of solved cases in a solved case database, the case data comprising a set of attributes and attribute values for each of the solved cases; storing component data for a plurality of apparatus in a domain database, the component data comprising a plurality of attributes; storing configuration data for a plurality of identified apparatus in a configuration database, the configuration data comprising indicators for the components that are not part of each of the identified apparatus; prompting the user to select a problem apparatus from the plurality of identified apparatus stored in the configuration database; creating a relevant attributes list comprising all of the attributes in the selected problem apparatus; and creating a subset of solved cases by filtering from the solved case database, any solved case that contains an attribute not in the relevant attributes list.

Another aspect of the invention is directed to a method for selecting and displaying to a user the configuration of a specific apparatus, comprising the steps of: storing data fro a plurality of components in a domain database, the data comprising a set of components and defining a hierarchical relationship between the components; storing data for a plurality of specific apparatus in a configuration database, the data comprising references to the components that are not part of a specific apparatus; prompting the user to select a specific apparatus from the configuration database; selecting the set of domain components from the domain database that are in the domain of the specific apparatus; creating a specific set of components for the specific apparatus by removing from the set of domain components any components that are excluded from the specific apparatus as defined by the configuration database; and displaying to the user the hierarchy of the specific set of components.

A further aspect of the invention is a method for limiting the number of questions asked of a user while solving a problem in a case-based reasoning system, comprising the steps of: storing data for a plurality of components in a domain database, the data comprising and defining a hierarchical relationship between the components, the lower-most level of the hierarchy being the attributes; storing in the domain database a question for each attribute in the domain database; storing data for a plurality of specific apparatus in a configuration database, the data comprising references to the components that are not part of a specific apparatus and a plurality of default values for the attributes for each specific apparatus; prompting the user to select a specific apparatus from the configuration database; prompting the user to select a component from within the specific apparatus; and posing to the user the question for each attribute in the selected component except for the attributes that have default values.

The invention is also directed to a method for assisting a user in solving a new problem case for a specific apparatus, comprising the steps of; storing data for solved cases in a solved case database; storing data for components in a domain database, the data defining a hierarchical relationship between the components; storing data in a configuration database, the data comprising references to the components in the domain database that are not part of a specific apparatus; prompting the user to select a specific apparatus; displaying to the user the hierarchy of the components in the selected apparatus; allowing the user to select a component from the hierarchy of components; prompting the user to provide values for the attributes within the selected component; creating a list of candidate solved cases based upon the attribute values provided by the user; comparing the set of attributes in the selected apparatus to the attributes of each case in the list of candidate solved cases and removing any case from the list of candidate solved cases that contains an attribute not within the set of attributes in the selected apparatus; presenting the list of candidate solved cases to the user; repeating the above steps until the user is satisfied with the list of solved cases.

The invention is also directed to a computer system for assisting a user in solving a new problem case relating to a specific apparatus, comprising: storage means for storing a solved case database comprising a plurality of solved cases, each of said solved cases comprising a plurality of attributes and values of the attributes, a domain database comprising a plurality of components each component comprising a number of attributes, the components being stored in a hierarchical relationship, and a configuration database defining the composition of a plurality of apparatus by storing references to the components in the domain database that are not part of a specific apparatus; a user interface, comprising output means for outputting to the user the components of a specific apparatus and questions associated with each attribute of the specific apparatus and input means for enabling the user to provide answers to the questions, thereby providing values for each attribute; processing means coupled to the storage means and the user interface for selecting cases relevant to the new problem case, comprising: means for searching the solved case database to obtain a set of solved cases that have attribute values that match the attribute values provided by the user; means for comparing the set of attributes in the specific apparatus of each case in the set of solved cases any case that contains an attribute not within the set of attributes in the specific apparatus; and wherein the output means includes means for displaying to the user, the set of solved cases in order of relevance to the new problem.

BRIEF DESCRIPTION OF THE DRAWINGS

The present invention will now be described, by way of example only, with reference to the following drawings, in which like reference numerals refer to like parts, and in which:

FIG. 9 is an illustration of the equipment selection screen from the present invention;

DETAILED DESCRIPTION OF THE INVENTION

Figure 1:
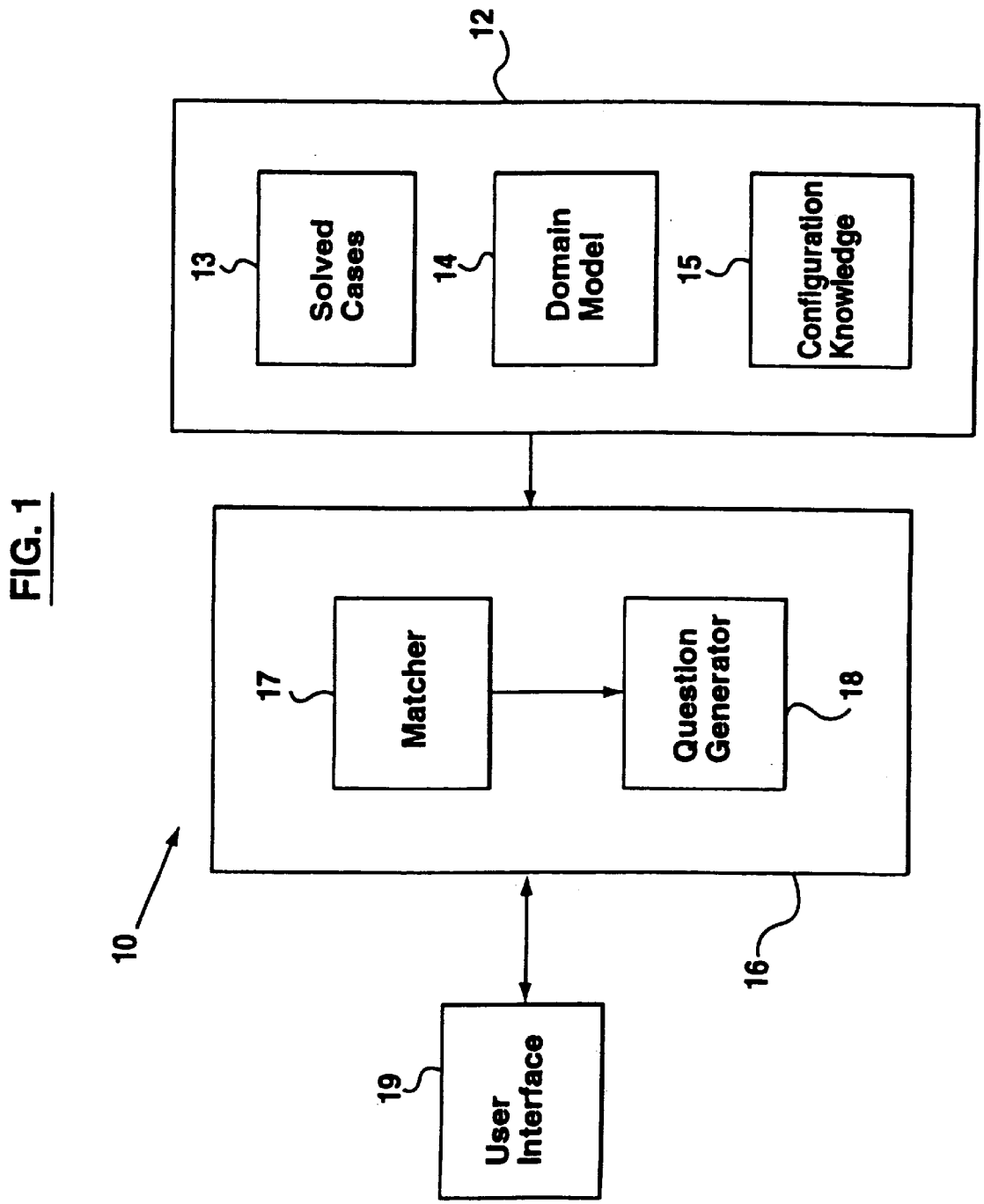
FIG. 1 is a schematic diagram of a system made in accordance with a preferred embodiment of the subject invention.

Referring to FIG. 1, illustrated therein is a case-based reasoning system shown generally as 10, made in accordance with a preferred embodiment of the subject invention. System 10 assists users in solving a new problem by retrieving case information on known problems and their solutions, within a particular domain, such as a complex apparatus, and comparing information about the new problem with the solved case information. Case-based reasoning system 10 comprises a plurality of databases 12 comprising a solved cases database 13, a domain model database 14 and a configuration knowledge database 15. A reasoning engine 16 comprises a matcher 17 and a question generator 18. User interface 19 interacts with the user and the reasoning engine 16 to assist the user to solve the current problem case.

In solving a current problem case, user interface 19 aids the user in identifying as much information as is possible regarding the details of the current problem case. This information is then passed to reasoning engine 16 which utilizes matcher 17 to extract all stored cases from solved cases database 13 that appear to be relevant to the current problem case. Each solved case in solved cases database 13 comprises a number of attributes and information about each attribute, including its value. An attribute corresponds to an observation that may be recorded regarding a component in the apparatus. At its most basic level, case-based reasoning consists of an attribute by attribute comparison of the attribute values of the current problem case to the attribute values in each stored case.

Matcher 17 of the preferred embodiment, as disclosed in pending U.S. application Ser. No. 08/835,558, filed Apr. 4, 1997, now U.S. Pat. No. 5,822,743, the disclosure of which is hereby incorporated by reference, uses numerous matching schemes to compare attributes. For attributes that have numeric values or values that can be converted to a numeric range, the comparison is preferably done by way of a quad-tuple function. The purpose of the quad-tuple function is to determine how similar the value of a given attribute in the current problem case is to its corresponding attribute in the stored case. For nonnumeric attribute values, a number of other algorithms may be used to calculate similarity, the most common being a simple similarity matrix. Once a similarity value has been calculated for each attribute in the problem case as it compares to its corresponding attribute in the solved case, these similarity values are combined to create an overall similarity rating between the current problem case and the solved case. This overall similarity computation is not restricted simply to summing the values of the individual attribute similarities. Rather, it also involves considering the weighting factor for each attribute in the solved case. The weighting factor for an attribute indicates how important the value of that attribute is to the diagnosis of the problem solved by that case. A further feature considered by matcher 17 is the must match setting for an attribute. The must match setting for each attribute allows the case similarity computation to be overridden. Must match causes a solved case that fails similarly for a critical attribute to be eliminated from consideration, regardless of how similar its remaining attributes are to the current problem.

Having selected the most relevant solved cases, matcher 17 then passes the list of relevant selected cases to question generator 18. Question generator 18 examines each relevant case in order and proposes a list of relevant questions. The selection of relevant questions is based upon a number of factors, the most important being the weight or importance of a specific attribute to the overall solution stored within the case. Further, questions will not be asked regarding attributes that are dependant upon other attributes. For example, it may not be practical to request information about gear teeth damage without first knowing that the gear box has been dismantled.

The preferred embodiment of system 10 introduces configuration knowledge to the system disclosed in the applicant's aforementioned pending application. Configuration knowledge is knowledge about the equipment configuration of a plurality of identified pre-existing pieces of apparatus subject to diagnosis. An example of such an apparatus would be a 747-400 airplane with tail number XYZ123, comprising a set of known components. Configuration knowledge for a pre-existing identifiable piece of apparatus has two elements, default observations for components in the apparatus and component exclusion knowledge. Default observations are values that are known to be constant for a specific component. Component exclusion knowledge is data that defines which components in the database of all possible components are not in the identified piece of apparatus for which the current problem exists. Any solved cases that reference a component excluded by the exclusion knowledge will not be relevant to the current problem. This configuration knowledge is stored in the configuration knowledge database 15.

Figure 2:
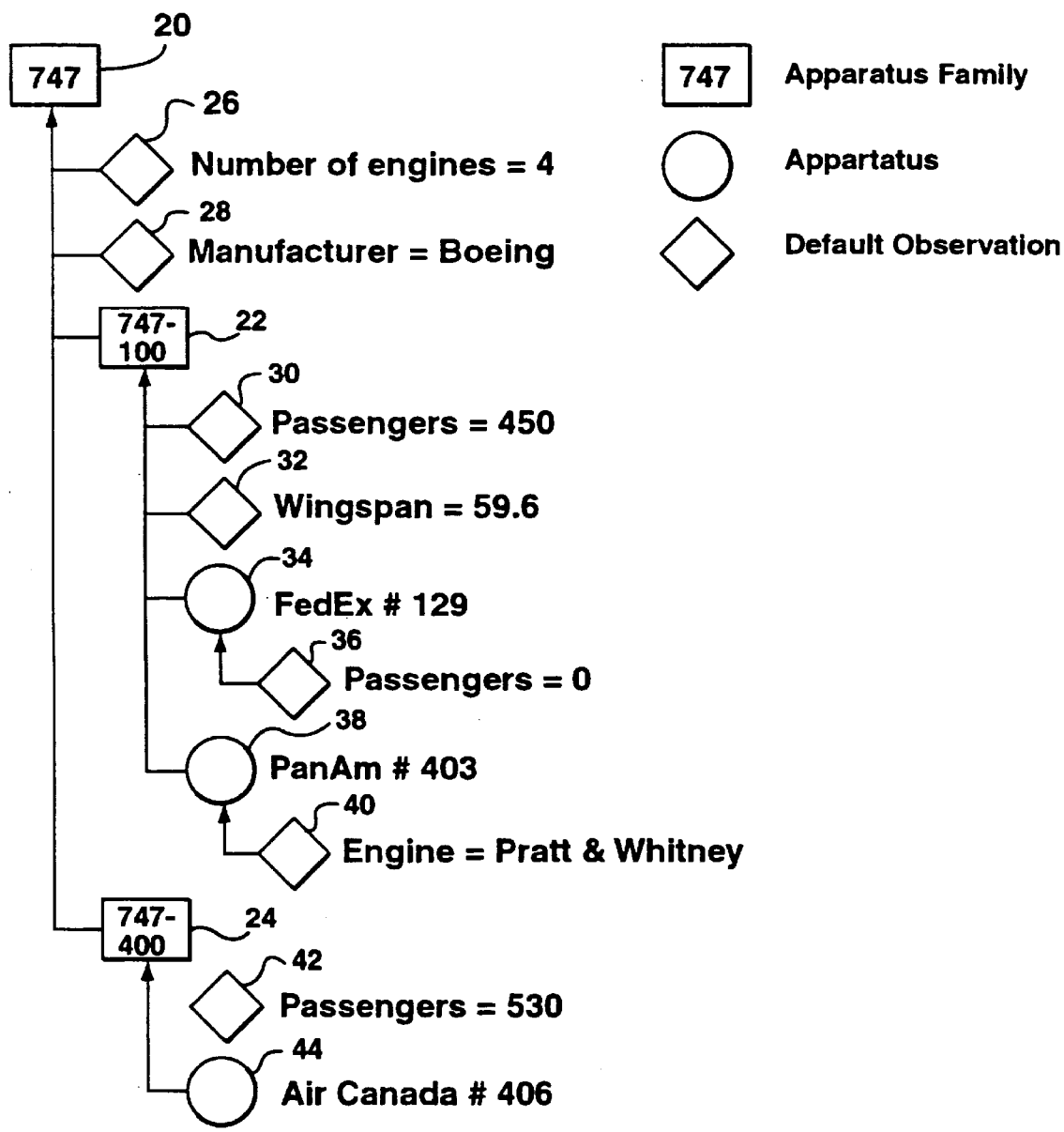
FIG. 2 is a schematic diagram of an example of the default observation element of configuration knowledge.

FIG. 2 is a schematic diagram of an example of the default observation element of configuration knowledge, stored within configuration knowledge database 15. FIG. 2 illustrates three different elements: apparatus family, apparatus and default observation. Each specific apparatus inherits default observations from its apparatus family. Apparatus family 20 applies to 747 aircraft. Apparatus family 22 refers to the specific 747 group known as 747-100. Similarly, apparatus family 24 refers to the group known as 747-400. Apparatus families 20, 22, and 24 all have the common default observations 26 and 28. Apparatus family 22 has default observations 30 and 32. Thus, apparatus 34 inherits default observations 26, 28, 30 and 32 from apparatus families 20 and 22. Apparatus 34 further has default observation 36. A default observation is an observation specific to the apparatus of which it is a part. Although apparatus family 22 has a default observation 30 for the number of passengers, specific apparatus within the apparatus family 22 may have default observations for the number of passengers that override the default observation 30. Thus, in apparatus 34, default observation 36 overrides default observation 30. Apparatus 38 has a default observation 40 which defines the type of engines in the aircraft. As is the case with apparatus 34, apparatus 38 inherits default observations 26, 28, 30 and 32. Apparatus type 24 contains default observation 42 and apparatus 44 which inherits default observations 26, 28 and 42.

A domain is a set of related components. For example, the domain of 747 aircraft would consist of all components that may exist in any configuration of a 747 aircraft. The domain of 747 aircraft may include components for 747-100 and 747-400 aircraft. These two different models of 747 aircraft will have some components in common and they will have others that are not in common, yet they are both within the domain of 747 aircraft. It is this domain structure that is defined in the domain model database (FIG. 1). A domain is defined hierarchically. For example the domain of 747 aircraft may have groups of components for engines, navigation systems, and landing systems. These groups may have further sub-groups and so on.

Because of configuration differences, a domain may contain groups of components that are not applicable to all apparatus within the domain. For example components in a navigation system manufactured by XYZ company, are not applicable to an airplane that has a navigation system manufactured by ABC company. Each airplane will have components from either XYZ or ABC, but not both.

To support variations of this type, the invention allows component exclusions to be specified for each piece of pre-existing apparatus. It is these exclusions that make up the apparatus exclusion component of configuration knowledge. In the preferred embodiment, this is achieved by storing in the configuration knowledge database 15, information on the groups of components in the domain hierarchy that are not in the apparatus. Within a domain there are generally more common components between apparatus than there are exclusions, thus, it is more efficient to store information on what is excluded from a specific apparatus, rather than what is included.

Figure 3:
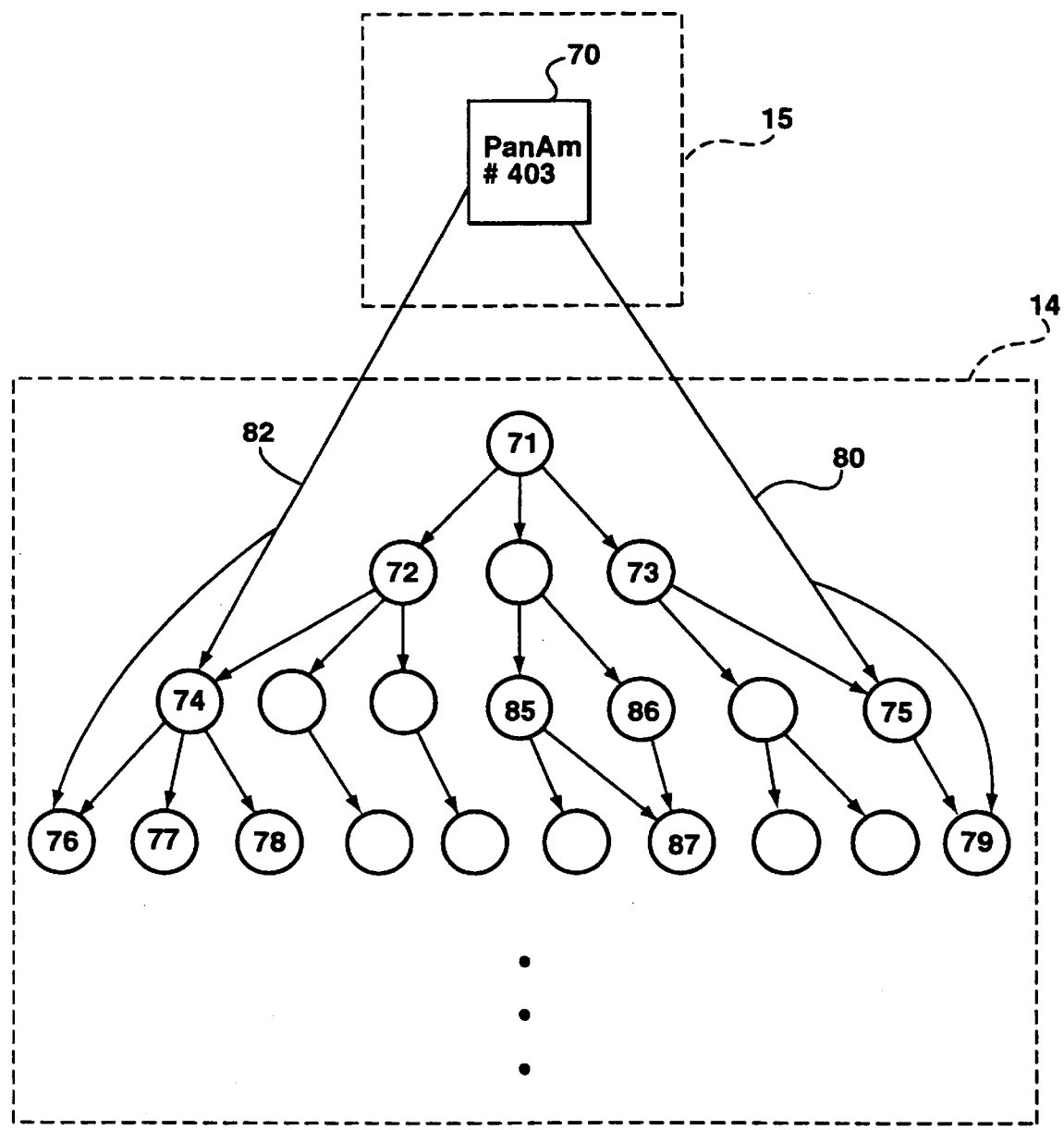
FIG. 3 is a schematic diagram of an example of component exclusion.

FIG. 3 is a schematic diagram showing how components are excluded from a pre-existing, identified piece of apparatus. A specific apparatus, 70 within the configuration knowledge database 15, such as a 747-400 with tail number XYZ123, has exclusion information links 80 and 82 into the domain model 14. Within domain model 14 the components that make up the domain are linked together in a hierarchy. Thus root component 71 has sub-components 72 and 73, which in turn have further sub-components 74 and 75. Exclusion information link 80 points to component 75 and sub-component 79. Exclusion information link 82 points to component 74 and sub-component 76. Each exclusion link identifies a component and sub-component in the hierarchy within the domain model 14. As components 76 and 79 are excluded, so are all of their sub-components (not shown). Exclusion information links to both the component and sub-component are stored as a sub-component may have more than one parent component. For example, a common electrical connector may be used in many different components of an airplane and should only be excluded from those components that are excluded in the specific apparatus. Component 87 is a component that is a sub-component of components 85 and 86. Thus an exclusion link to component 86 and sub-component 87 would not exclude sub-component 87 from component 85.

Part of the functionality of reasoning engine 16 is exclusion filtering. Exclusion filtering improves reasoning capability by eliminating cases that contain information irrelevant to the apparatus being worked on. This is achieved by filtering the set of potential solutions by excluding cases which contain attributes which are not within the domain of the current problem apparatus. Known apparatus 70 of FIG. 3 has components 76 and 79 and all of their sub-components excluded from its configuration. Thus, any case that has attributes specific to the excluded components 76 and 79 and their sub-components does not apply to apparatus 70 and will be excluded from the set of potential solutions.

Figure 4:
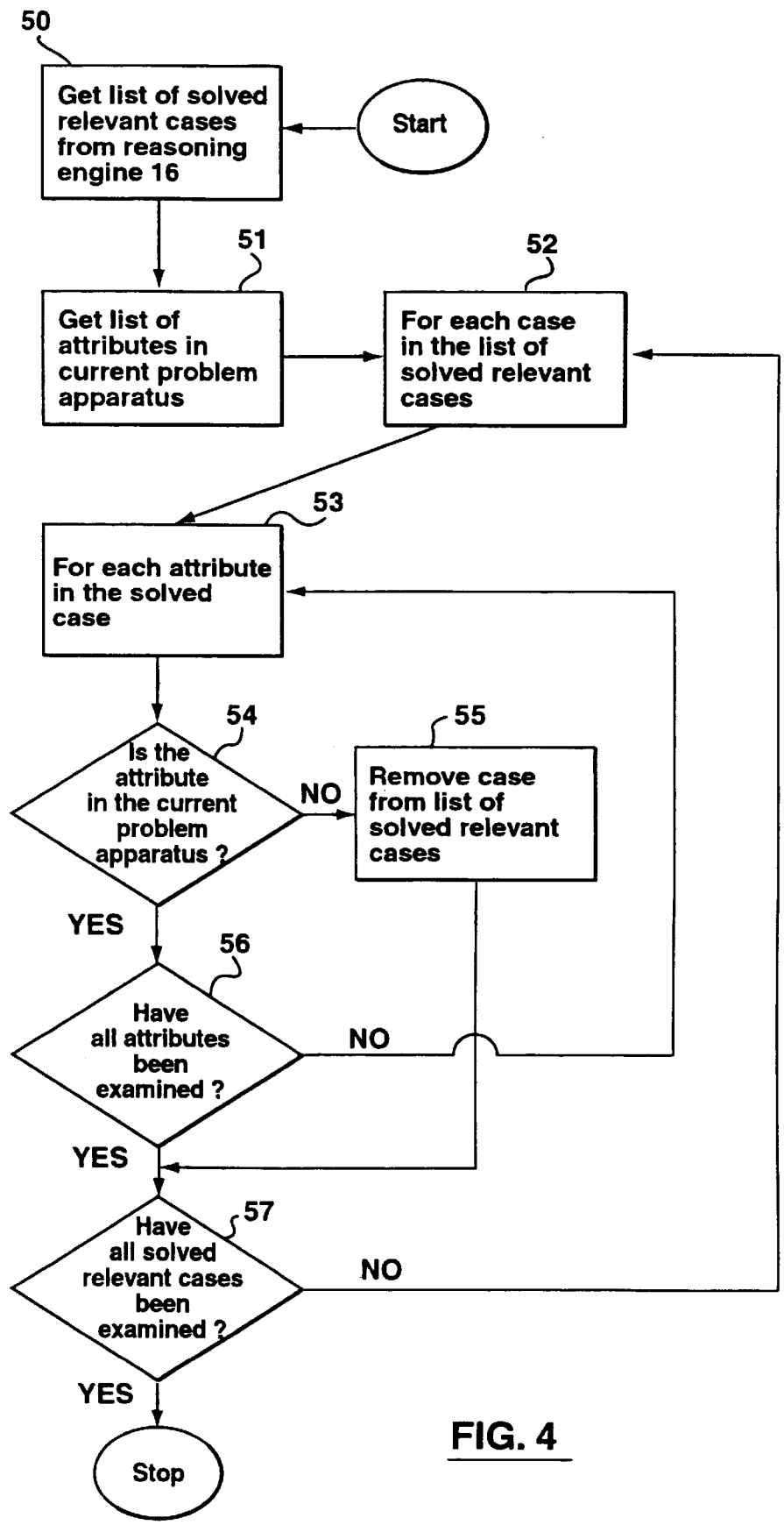
FIG. 4 is a control flow diagram illustrating how solved cases are excluded from the set of potential problem solutions based upon configuration knowledge.

FIG. 4 is a control flow diagram showing how solved cases are excluded from the set of potential problem solutions based upon configuration knowledge. Processing begins with step 50 where a list of solved relevant cases is obtained from reasoning engine 16. This is the list of solved cases selected by matcher 17 of FIG. 1 from solved cases database 13 of FIG. 1, based upon information provided by the user. The process then proceeds to step 51, where a list of all attributes for the current problem case is created. The list of attributes consists of all attributes contained within the configuration of the problem apparatus undergoing diagnosis. At step 52, the first case from the list of solved relevant cases is selected. At step 53, the attributes in the list prepared in step 51 are compared to the attributes in the case selected in step 52. At step 54, if an attribute is found in the current solved case that does not exist in the domain of the current problem case, the process moves to step 55 where the current solved case is removed from the list of relevant solved cases. If the current attribute is in the domain of the current problem case and in the current solved relevant case, the process moves to step 56. At step 56, if all attributes for the current solved case have been examined, the process moves to step 57, else it returns to step 53 to examine the next attribute in the current solved case. At step 57, a test is made to determine if all solved relevant cases have been examined. If they have not, the process returns to step 52 and the next case from the list of solved relevant cases is selected. If all solved relevant cases have been examined, the processing for this module ends. At the end of processing this module, the list of solved relevant cases will contain only cases that have all of their attributes within the configuration of the specific apparatus for which the current problem exists.

Each attribute in the domain has questions associated with it. The questions are designed to prompt the user to provide a value for the attribute when required for solving the problem at hand. One of the advantages of providing a default observation for an attribute is that since the information is known to the system, the system does not need to pose the question associated with that attribute. Referring to FIG. 2, if the user has selected specific problem apparatus 34, then questions need not be posed for the attributes: wingspan, number of passengers, manufacturer or number of engines, as these questions have already been answered by default values. The user, however, has the option of change the values if appropriate.

Figure 5:
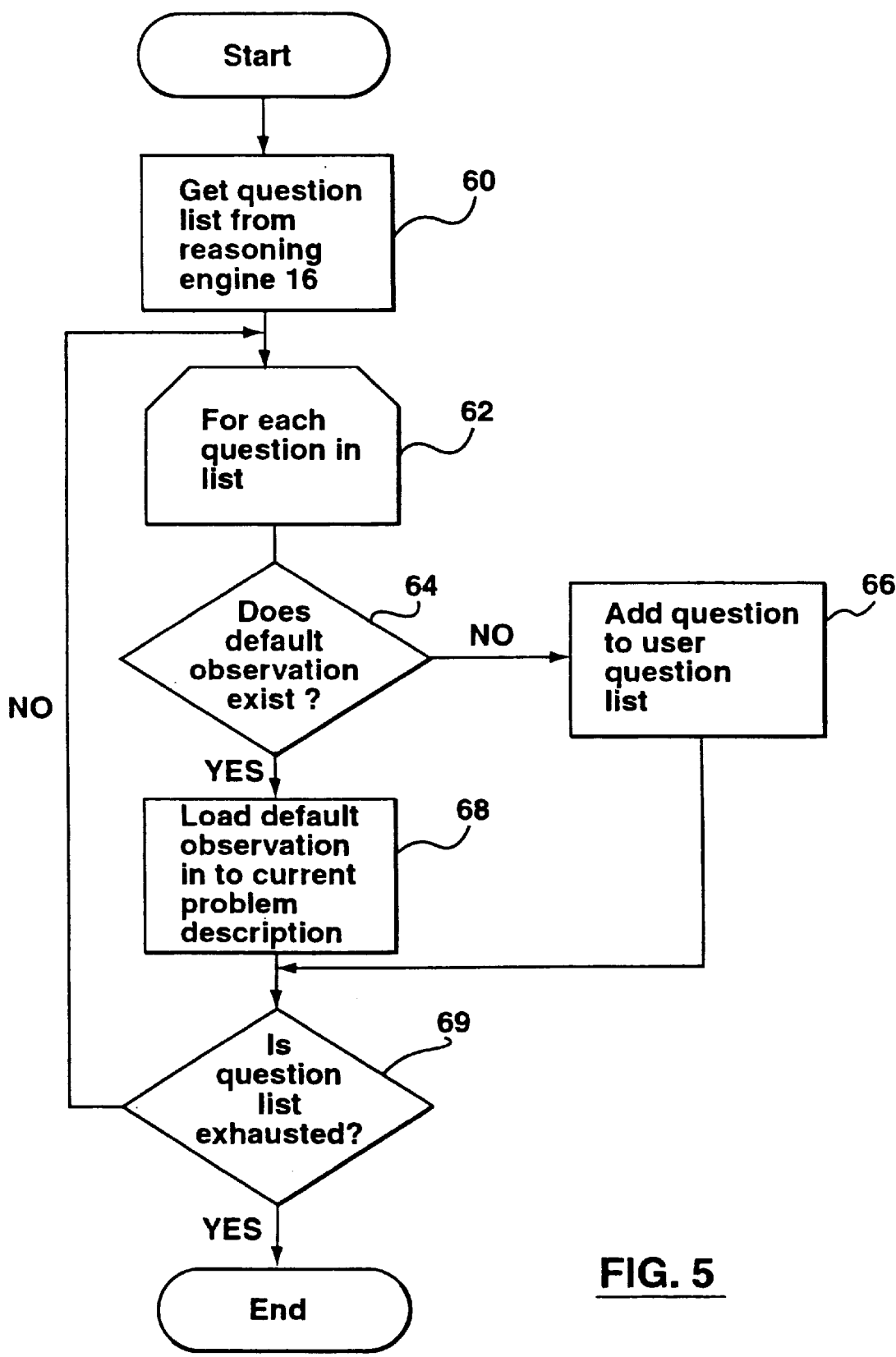
FIG. 5 is a control flow diagram illustrating how default observations interact with question selection.

FIG. 5 is a control flow diagram illustrating how default observations interact with question selection. Beginning at step 60, a list of questions that apply to the relevant cases selected from the case base is provided by search reasoning engine 16. Each question is then read at step 62. At step 64, if a default observation does not exist for the specific question, then the question is added to the user question list by step 66. If a default observation does exist, then the default observation is added to the current problem description posed by the user at step 68. Step 69 checks to determine if all questions on the list have been examined, and if they have, the system exits; if not, control flow returns to step 62.

Thus, configuration knowledge aids the reasoning engine in determining which cases from the set of solved cases are not relevant to the problem case at hand. Further, the provision of default observations for an apparatus aid the question generation component of the reasoning engine in determining which questions do not need to be posed to the user.

Figure 6:
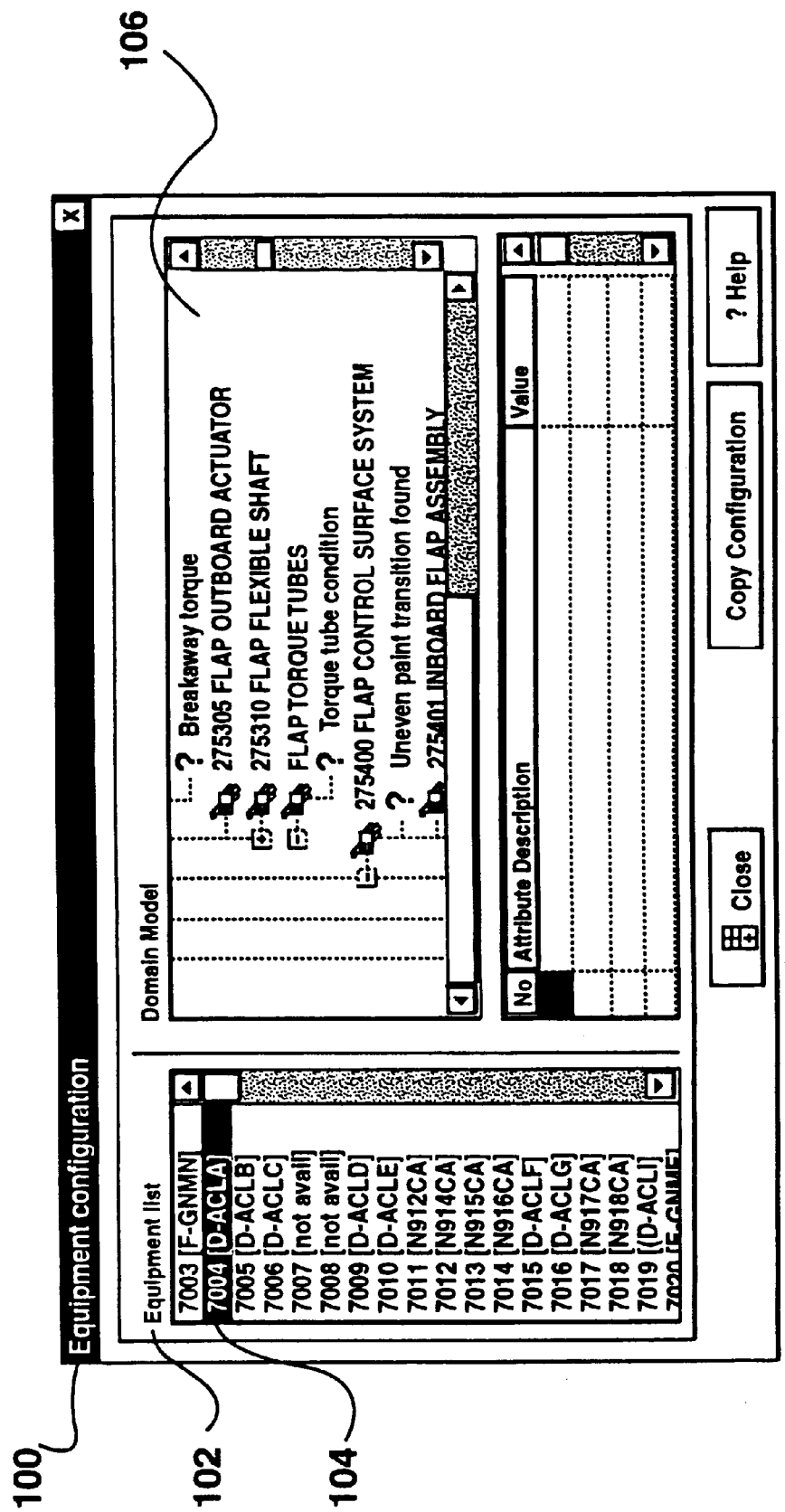
FIG. 6 is an illustration of an equipment configuration screen from the present invention.

FIGS. 6 through 11 illustrate various screens of the user interface 19 that are accessible by the user in attempting to solve a current problem. The screens display information on two models of commercial aircraft. The models are the older CRJ and the more recent CRX model. The screens refer to each aircraft as a piece of "equipment" which has been referred to as "apparatus" throughout this disclosure. FIG. 6 illustrates the complete domain model containing both the CRJ and CRX models of aircraft. Reference numeral 100 indicates that this is an equipment configuration screen. This screen would be used by a knowledge engineer to configure the components of each individual airplane. The equipment list 102 lists all of the airplanes within the selected domain. The piece of equipment or apparatus number 7004 is shown selected at 104. The Domain Model window 106 illustrates the configuration of the selected piece of equipment 104.

Figure 7:
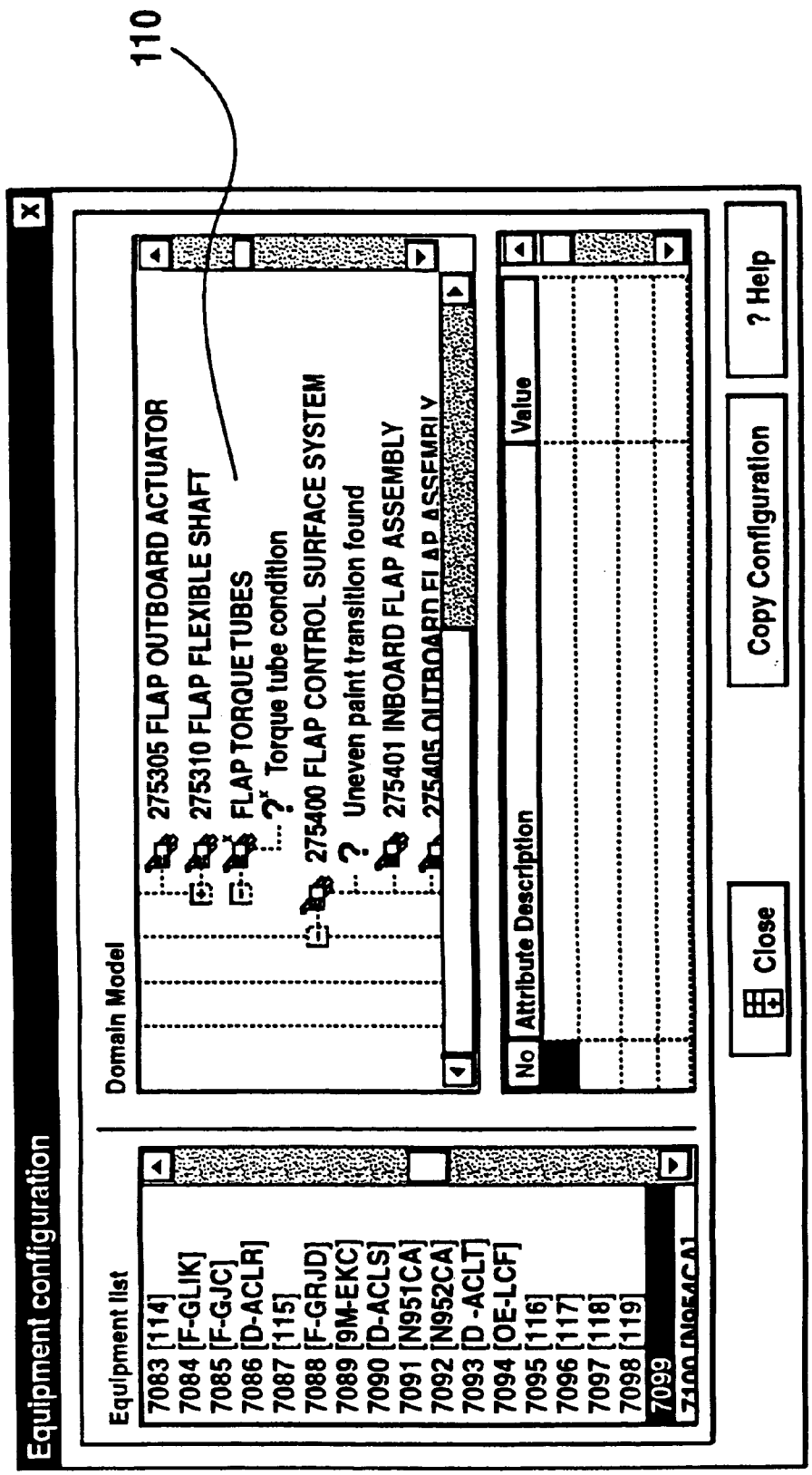
FIG. 7 is an illustration of an equipment configuration screen from the present invention.

FIG. 7 illustrates another equipment configuration screen, this time with aircraft number 7099 selected at 108. Aircraft number 7099 is a CRJ model which do not have Flap Torque Tubes. The domain model window at 110 indicates that the selected equipment item does not have Flap Torque Tubes. This is indicated by the small "x" beside "Flap Torque Tubes". Note that once a component has been excluded, all attributes and associated values below the excluded component are also excluded. Here we see that a question relating to Torque tube condition has also been excluded from the configuration of the aircraft selected at 108.

Figure 8:
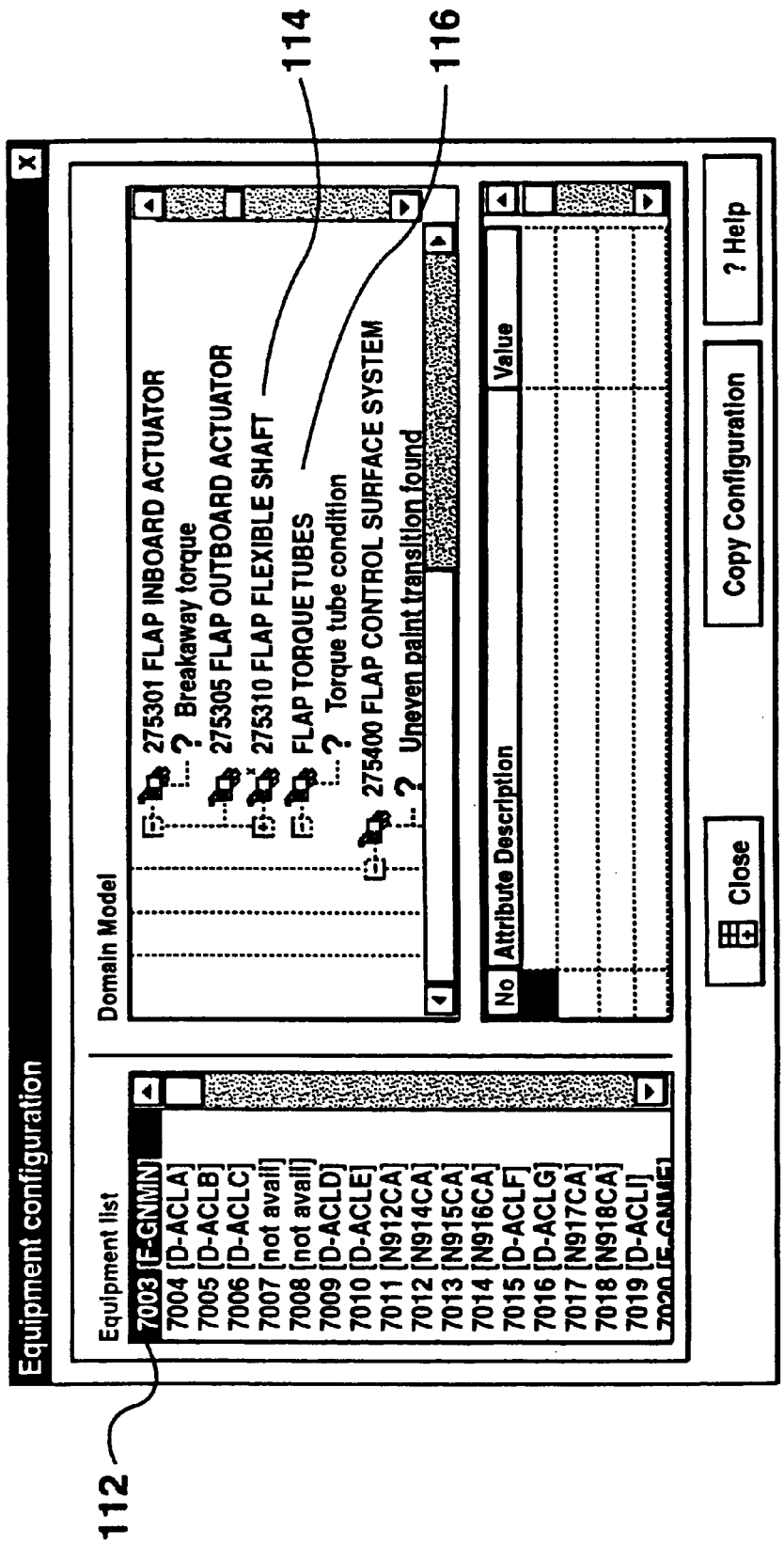
FIG. 8 is an illustration of an equipment configuration screen from the present invention.

FIG. 8 illustrates an equipment configuration screen where a CRX aircraft has been selected. CRX aircraft have a Flap Torque Tube, but not a Flap Flexible Shaft. The aircraft identified as number 7003 is selected at 112. The configuration of the selected aircraft has excluded from the domain window at 114 the Flap Flexible Shaft component as indicated by the small "x" above the component. Note, however, that since it is a CRX model it does have Flap Torque Tubes as indicated at 116.

In use the user first selects the apparatus in which the current problem resides. FIG. 9 illustrates the starting screen displayed to the user as the user begins a problem solving session. The airline code 118 identifies the aircraft owner and thus will limit selection of a specific airplane to the airplanes owned by that airline. The serial numbers of the airplanes owned by the selected airline 118 are displayed on the right hand side of the screen at 120. Here we see that the user has selected serial number 7152 which the system knows from the configuration data is a type CRJ.

Figure 10:
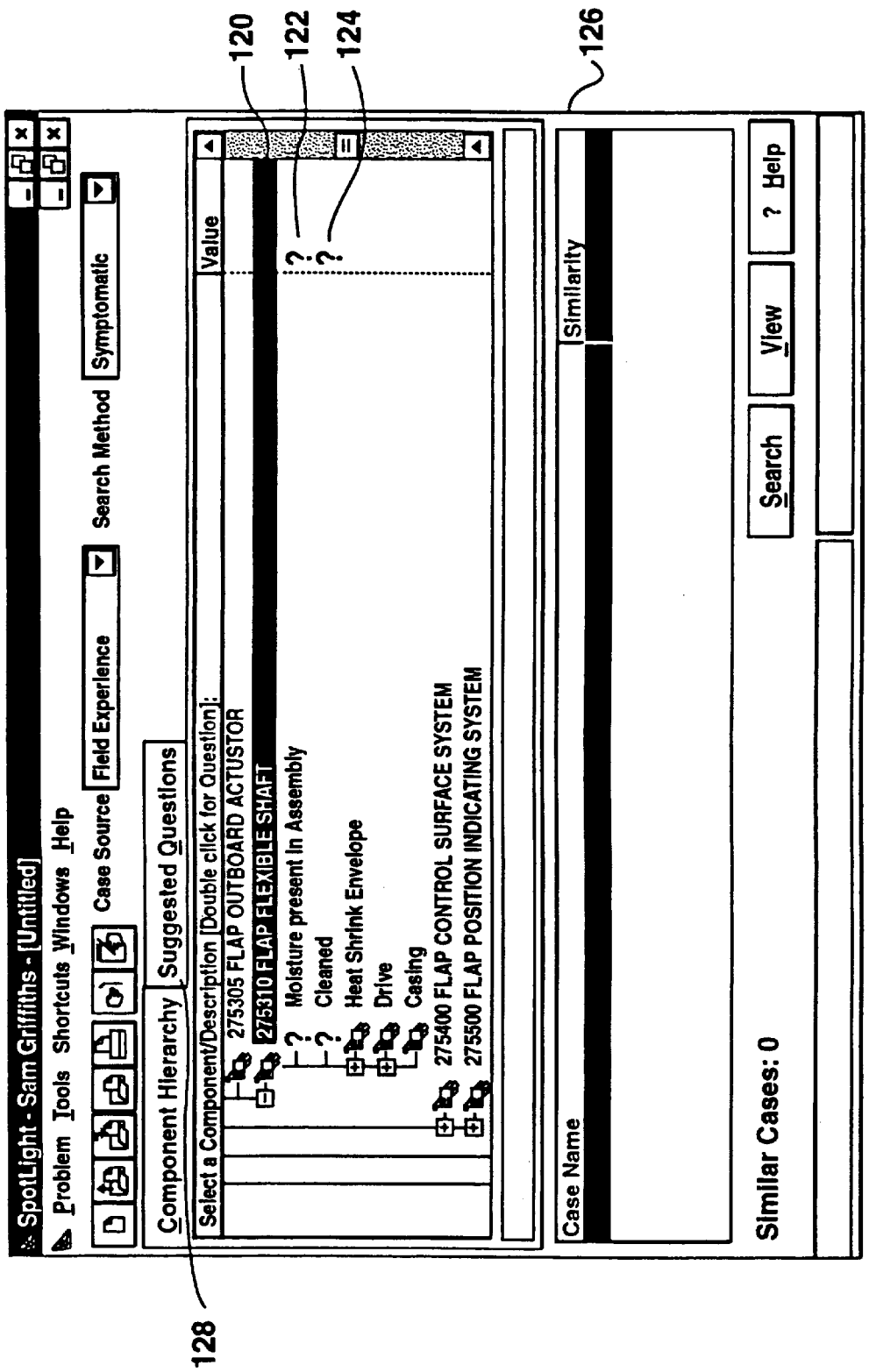
FIG. 10 is an illustration of the question answering screen of the present invention.

FIG. 10 illustrates the next screen viewed by the user. Shown at 120 is the Flap Flexible Shaft component which is specific to the CRJ model of aircraft. Here we see two questions associated with the Flap Flexible Shaft at 122 and 124. If the problem appeared to be with the Flap Flexible Shaft the user would answer one or both of these questions and initiate a search for similar cases. The search results along with a similarity ranking would be displayed at 126. The user may then examine the details of a specific case or at 128 request to be asked additional questions to help locate the most relevant cases.

Figure 11:
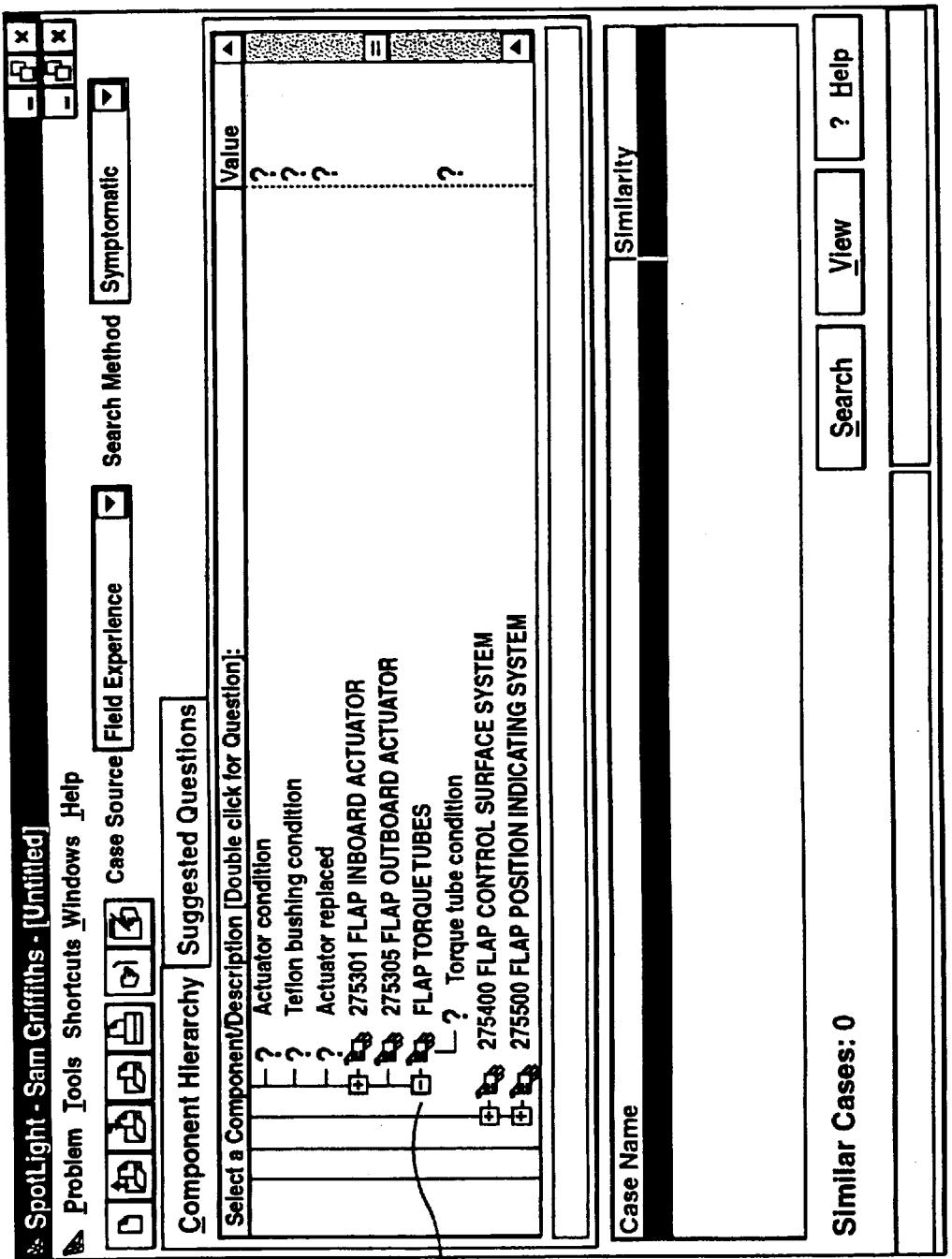
FIG. 11 is an illustration of the question answering screen of the present invention.

FIG. 11 is similar to FIG. 10 but illustrates the configuration of a specific component of CRX model of aircraft. Here we see at 128 that the CRX model of aircraft have Flap Torque Tubes instead of the Flexible Flap Shaft of the model CRJ. This illustrates that only the configuration information relevant to the selected aircraft is displayed to the user during the problem solving process.

This process of question and answer is repeated until the user is satisfied with one or more of the solved cases or is convinced that no solution is available from within the base of stored cases.

The current embodiment filters irrelevant cases from the list of relevant solved cases after each search by the reasoning engine 16. An alternative embodiment would select all solved cases that apply to the problem apparatus and cache those cases in computer memory for rapid access. Such an embodiment would avoid having to filter non-relevant cases after each search.

As will be apparent to those skilled in the art, various modifications and adaptations of the method and system described above are possible without departing from the present invention, the scope of which is defined in the appended claims.

We claim:

1. A method for matching solved cases to a new problem in a case-based reasoning system, comprising the steps of:

(a) storing case data for a plurality of solved cases in a solved case database, the case data comprising a set of attributes and attribute values for each of the solved cases;

(b) storing component data for a plurality of apparatus in a domain database, the component data comprising a plurality of attributes;

(c) storing configuration data for a plurality of identified apparatus in a configuration database, the configuration data comprising indicators for the components that are not part of each of the identified apparatus;

(d) prompting the user to select a problem apparatus from the plurality of identified apparatus stored in the configuration database;

(e) creating a relevant attributes list comprising all of the attributes in the selected problem apparatus; and (f) creating a subset of solved cases by filtering from the solved case database, any solved case that contains an attribute not in the relevant attributes list.

2. The method of claim 1 wherein said component data is organized in a hierarchical relationship, the lowermost level of the hierarchy being the attributes.

3. The method of claim 1 wherein step (e) comprises the steps of:

(a) traversing the hierarchical domain of the identified apparatus in the domain database and constructing a list of all attributes within the domain;

(b) reading the list of components in the configuration database that are excluded from the identified apparatus;

(c) traversing the components located in step (b) in the hierarchical domain of the identified apparatus and preparing a list of all attributes in all components traversed; and (d) removing from the list of attributes created in step (a) all attributes in the list created in step (c).

4. A method for selecting and displaying to a user the configuration of a specific apparatus, comprising the steps of:

(a) storing data for a plurality of components in a domain database, the data comprising a set of components and defining a hierarchical relationship between the components;

(b) storing data for a plurality of specific apparatus in a configuration database, the data comprising references to the components that are not part of a specific apparatus;

(c) prompting the user to select a specific apparatus from the configuration database;

(d) selecting the set of domain components from the domain database that are in the domain of the specific apparatus;

(e) creating a specific set of components for the specific apparatus by removing from the set of domain components any components that are excluded from the specific apparatus as defined by the configuration database; and (f) displaying to the user the hierarchy of the specific set of components.

5. A method for limiting the number of questions asked of a user while solving a problem in a case-based reasoning system, comprising the steps of:

(a) storing data for a plurality of components in a domain database, the data comprising and defining a hierarchical relationship between the components, the lowermost level of the hierarchy being the attributes;

(b) storing in the domain database a question for each attribute in the domain database;

(c) storing data for a plurality of specific apparatus in a configuration database, the data comprising references to the components that are not part of a specific apparatus and a plurality of default values for the attributes for each specific apparatus;

(d) prompting the user to select a specific apparatus from the configuration database;

(e) prompting the user to select a component from within the specific apparatus; and (f) posing to the user the question for each attribute in the selected component except for the attributes that have default values.

6. A method for assisting a user in solving a new problem case for a specific apparatus, comprising the steps of:

(a) storing data for a plurality of solved cases in a solved case database, the data comprising a set of attributes and values of the attributes for each of the solved cases;

(b) storing data for a plurality of components in a domain database, the data defining a hierarchical relationship between the components, the lowermost level of the hierarchy being the attributes;

(c) storing data for a plurality of specific apparatus in a configuration database, the data comprising references to the components from the domain database that are not part of a specific apparatus;

(d) prompting the user to select a specific apparatus from the configuration database;

(e) displaying to the user the hierarchy of the components in the selected apparatus;

(f) allowing the user to select a component from the hierarchy of components;

(g) prompting the user to provide values for the attributes within the selected component;

(h) creating a list of candidate solved cases from the solved case database based upon the attribute values provided by the user;

(i) comparing the set of attributes in the selected apparatus to the attributes of each case in the list of candidate solved cases and removing any case from the list of candidate solved cases that contains an attribute not within the set of attributes in the selected apparatus;

(j) presenting the list of candidate solved cases to the user; and (k) repeating steps (e) through (j) inclusive until the user is satisfied with the list of candidate solved cases.

7. A computer system for assisting a user in solving a new problem case relating to a specific apparatus, comprising:

(a) storage means for storing:
  (i) a solved case database comprising a plurality of solved cases, each of said solved cases comprising a plurality of attributes and values of the attributes;
  (ii) a domain database comprising a plurality of components each component comprising a number of attributes, the components being stored in a hierarchical relationship; and
  (iii) a configuration database defining the composition of a plurality of apparatus by storing references to the components in the domain database that are not part of a specific apparatus;

(b) a user interface, comprising output means for outputting to the user the components of a specific apparatus and questions associated with each attribute of the specific apparatus and input means for enabling the user to provide answers to the questions, thereby providing values for each attribute;

(c) processing means coupled to the storage means and the user interface for selecting cases relevant to the new problem case, comprising;
  (i) means for searching the solved case database to obtain a set of solved cases that have attribute values that match the attribute values provided by the user;
  (ii) means for comparing the set of attributes in the specific apparatus to the attributes of each case in the set of solved cases and removing from the set of solved cases any case that contains an attribute not within the set of attributes in the specific apparatus; and (d) wherein the output means includes means for displaying to the user, the set of solved cases in order of relevance to the new problem.

* * * * *